(12) United States Patent
Brichet et al.

(10) Patent No.: US 7,066,480 B2
(45) Date of Patent: Jun. 27, 2006

(54) SYSTEM FOR CONTROLLING A MOVING PART, STEERING SYSTEM FOR A LIGHT VEHICLE AND TRICYCLE FITTED WITH SAID SYSTEM

(75) Inventors: Rodolphe Brichet, Vendeuvre du Poitou (FR); Olivier Bonneau, Futuroscope Chasseneuil (FR)

(73) Assignee: Sport System Engineering, Futuroscope Cedex (FR)

( * ) Notice: Subject to any disclaimer, the term of this patent is extended or adjusted under 35 U.S.C. 154(b) by 73 days.

(21) Appl. No.: 10/482,817

(22) PCT Filed: Jul. 4, 2002

(86) PCT No.: PCT/FR02/02348

§ 371 (c)(1),
(2), (4) Date: Jan. 5, 2004

(87) PCT Pub. No.: WO03/004346

PCT Pub. Date: Jan. 16, 2003

(65) Prior Publication Data
US 2004/0173989 A1    Sep. 9, 2004

(30) Foreign Application Priority Data
Jul. 6, 2001    (FR) .................................. 01 09014

(51) Int. Cl.
*B62K 5/04*    (2006.01)
*B62M 1/12*    (2006.01)

(52) U.S. Cl. ...................... 280/234; 280/233; 280/247; 280/270; 280/282

(58) Field of Classification Search ................ 280/231, 280/232, 233, 234, 263, 270, 282, 247, 256; 301/35.61, 35.62, 35.63
See application file for complete search history.

(56) References Cited

U.S. PATENT DOCUMENTS

| | | | | |
|---|---|---|---|---|
| 3,960,392 A | * | 6/1976 | Read | 280/282 |
| 4,705,284 A | * | 11/1987 | Stout | 280/250.1 |
| 4,770,432 A | * | 9/1988 | Wagner | 280/250.1 |
| 4,795,381 A | * | 1/1989 | Willems | 440/26 |
| 5,069,469 A | | 12/1991 | Rosengrant et al. | |
| 5,542,690 A | * | 8/1996 | Kozicki | 280/304.1 |
| 5,690,346 A | * | 11/1997 | Keskitalo | 280/234 |
| 5,775,708 A | | 7/1998 | Heath | |
| 6,155,584 A | | 12/2000 | Dallet | |
| 6,179,314 B1 | * | 1/2001 | Jones | 280/282 |

FOREIGN PATENT DOCUMENTS

DE    30 346    2/1885
FR    2 651 742    3/1991

* cited by examiner

*Primary Examiner*—Anne Marie Boehler
(74) *Attorney, Agent, or Firm*—Oblon, Spivak, McClelland, Maier & Neustadt, P.C.

(57) ABSTRACT

The steering system according to the invention provides a means of coordinating the movements of the two steering handles on a machine such as light tricycle type vehicles propelled by a pedal (5) and propulsion arms (6).

Figure 1:
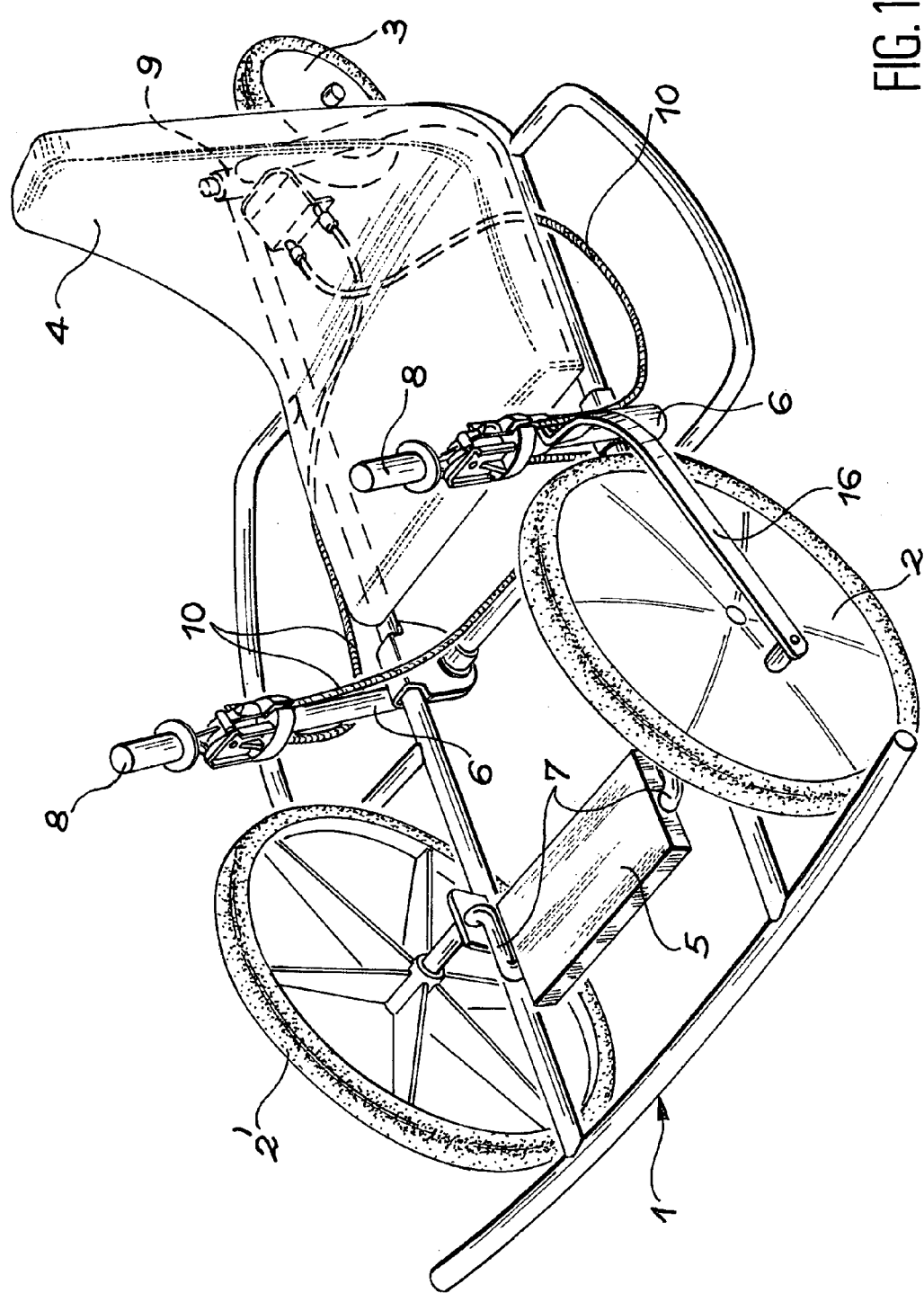

The steering system comprises two handles (8) installed free to pivot, each handle being installed at the end of one of the propulsion arms (6) and a first cable (10) being fixed to the bottom of each handle. The second end is fixed to the steering shaft (9) of the tricycle. A second cable connects the two handles to each other to coordinate the movement of the handles (8).

Application to leisure tricycles, light vehicles in general, indoor sports and medical re-education apparatus and static game facilities for leisure parks.

3 Claims, 3 Drawing Sheets

SYSTEM FOR CONTROLLING A MOVING PART, STEERING SYSTEM FOR A LIGHT VEHICLE AND TRICYCLE FITTED WITH SAID SYSTEM

FIELD OF THE INVENTION

The invention relates to a cable control system that can be used on a steering system for a light vehicle (tricycle, quadricycle, bicycle, water sports equipment, snowmobile) or on a behavioural control system for a fixed product (indoor sports, medical re-education, static game products for leisure parks).

PRIOR ART AND PROBLEM THAT ARISES

French patent No. 2 659 742 assigned to this applicant describes a tricycle equipped with a propulsion system to create a rotary movement by a combined action of a driver's hands and legs. The tricycle described in this document includes a seat arranged in the middle of the tricycle, on which the driver sits in a semi-lying position. A drive shaft is arranged on a frame and is driven in rotation by two drive cranks at the ends of the frame. Two pedals mounted on the control cranks on each side of the ends of the shaft enable the driver to press them in phase. Two control bars, or propulsion arms, are installed free to pivot on the tricycle floor on each side of the seat, so that they can be moved by hand at the same time, either pressing forwards or backwards, in the phase opposition with the pedals. Two connecting rods on each side of the pedals and fixed firstly to the pedals at a first end and secondly to the control bars at a second end, transmit alternating forces from the control bars to the driving wheels, through a large rotating plate, around which a chain is wound actuating the shaft of the driving wheels.

The steering control that is fitted on the tricycle is made by combined side offset of the two control bars. This reduces the reliability of these control bars and is not ergonomic. Furthermore, it is difficult to actuate these control bars for propulsion at the same time as offsetting them to steer the tricycle, particularly if it is intended to go around turns with a small radius of curvature.

Secondly, the document of American patent U.S. Pat. No. 5,775,708 by HEATH STEVEN C. describes a drive vehicle equipped with a cable control system. This machine is a training cycle on which the user stands up. Therefore the handlebar is raised and is composed of two side handles terminated by grips. Each of the grips is free to move to change direction and is connected to the steering system through a cable. Thus, the direction of the front wheel of the vehicle may be controlled by the user's hands while he is pedalling.

In this system, the action of one grip is independent of the action of the other grip. In other words, actions taken by the two grips are not coordinated. One of the disadvantages of this situation is that in case of danger, the user's reflexes cannot be relied on to take deliberate action on the appropriate grip to recover the situation.

Therefore, the main purpose of the invention is to propose another steering system that can be used on a tricycle, and that corrects a number of disadvantages including those mentioned above.

SUMMARY OF THE INVENTION

Consequently, a first object of the invention is a cable control system for a mobile part of a device composed of two separate pivoting handles each fixed to the first end of a first cable, the second end of one of the two first cables being fixed to one side of the steering shaft and the second end of the other of the two first cables being fixed to the other side of the steering shaft, to control the orientation of the mobile part by pivoting a side handle, in order to apply tension in the corresponding cable among the first two cables and make the mobile part move.

According to the invention, it comprises a second cable, one end of which is fixed to a first side handle, opposite to the first end of the corresponding first cable and the second end of which is fixed to the second side handle, opposite to the first end of the first corresponding cable. This arrangement slaves the two handles to each other. In this way, an operator action on one of the handles will cause a corresponding movement on the other handle, even if the operator does not act on the second handle. It can easily be understood that this makes it easier to drive a lightweight vehicle. Furthermore, in case of danger or an accident situation, a reflex action by the operator on either of the two handles will control the steering system, regardless of which handle is used.

A second object of the invention is a steering system for a vehicle with:
  at least one steering wheel installed free to rotate about an axis perpendicular to a steering shaft;
  two separate pivoting side handles each fixed to the first end of a first cable, the second ends of each of the two first cables being fixed to each side of the steering shaft, to control the orientation of the steering wheel by pivoting a side handle, in order to create tension in the corresponding cable among the two first cables and to cause rotation of the steering shaft.

According to the invention, it comprises a second cable, the first end of which is fixed to a first side handle, opposite the first end of the first corresponding cable and for which the second end is fixed to the second side handle opposite the first end of the corresponding first cable. This arrangement slaves the two handles to each other. In this way, an operator action on one of the handles will cause a corresponding movement on the other handle, even if the operator does not act on the second handle. It can easily be understood that this makes it easier to drive a lightweight vehicle. Furthermore, in case of danger or an accident situation, a reflex action by the operator on either of the two handles will control the steering system, regardless of which handle is used.

In the main embodiment of this system, a second cable is used for which a first end is fixed to a first side handle opposite the first end of the corresponding first cable, and the second end of which is fixed to the second side handle opposite the first end of the corresponding first cable.

Another main object of the invention is a tricycle using the system described above, the two side handles being placed on each side of the tricycle, each free to pivot about an approximately horizontal axis and each placed at the upper end of a side propulsion arm, itself mounted free to rotate about an approximately horizontal axis to oscillate in phase, each on one side adjacent to the body of a driver.

In the tricycle described in document FR-2 959 742, the device for transmission of forces applied by the driver to the driven wheels by his legs and arms is relatively complicated. Moreover, the system for transmission of forces applied to the control arms and the pedals is central, in other words the sprocket wheel and the transmission chain are located between the driver's legs. This was envisaged for a competition tricycle, but should be avoided if marketed for the general public, particularly for children, for safety reasons. It is very easy to get a finger, or a hand or even a foot trapped in the central transmission system, and consequently to injure the driver or damage the system.

In this case, the tricycle propulsion arms are coupled together so that they are actuated at the same time and in the same direction, to contribute to propulsion of the tricycle, by acting on a connecting rod/crank system linked to at least one driving wheel. The tricycle then has a single traction pedal located on the centre line of the tricycle, in front of the driver's seat, on a cranked drive shaft, to drive the at least one driving wheel of the tricycle.

In a first variant, the cranked drive shaft is the shaft of the at least one driving wheel.

In another variant, the cranked drive shaft drives a first toothed wheel itself driving a second toothed wheel fixed to the spindle of the driving wheels through a drive chain.

It is advantageous if a sheath is used around each of the cables.

The wheels are designed in lenticular form, for safety reasons.

LIST OF FIGURES

Figure 2:
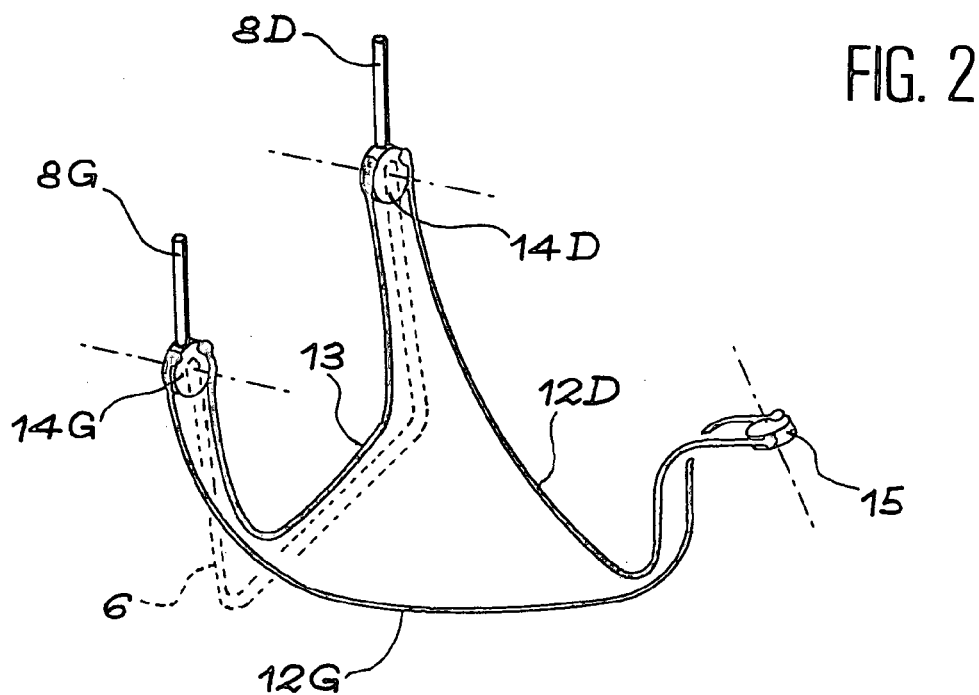
Figure 3:
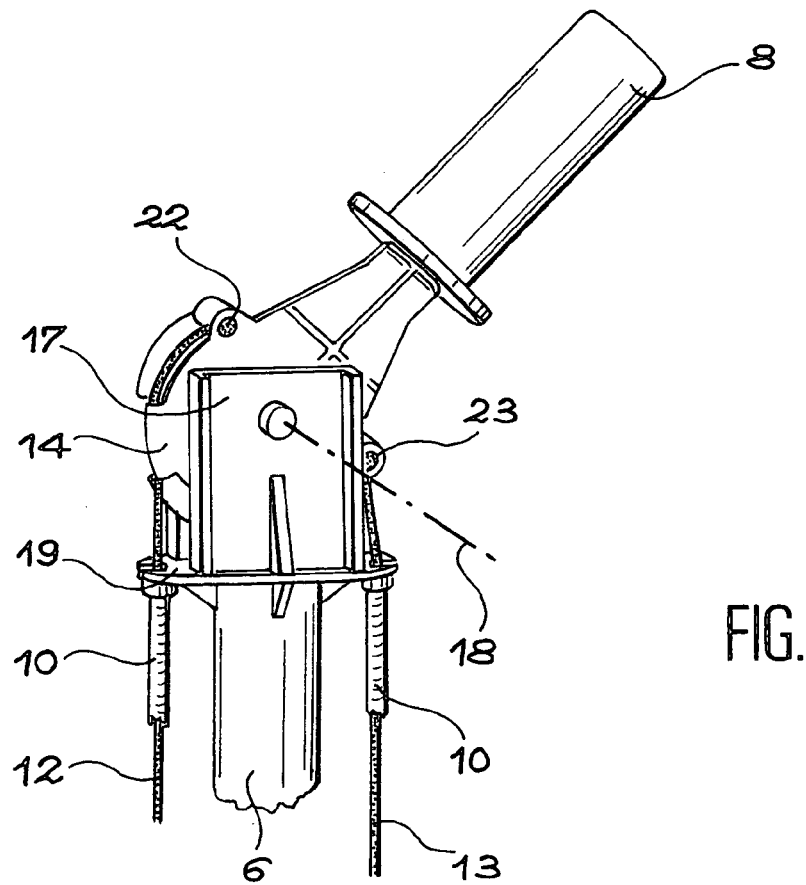
Figure 4:
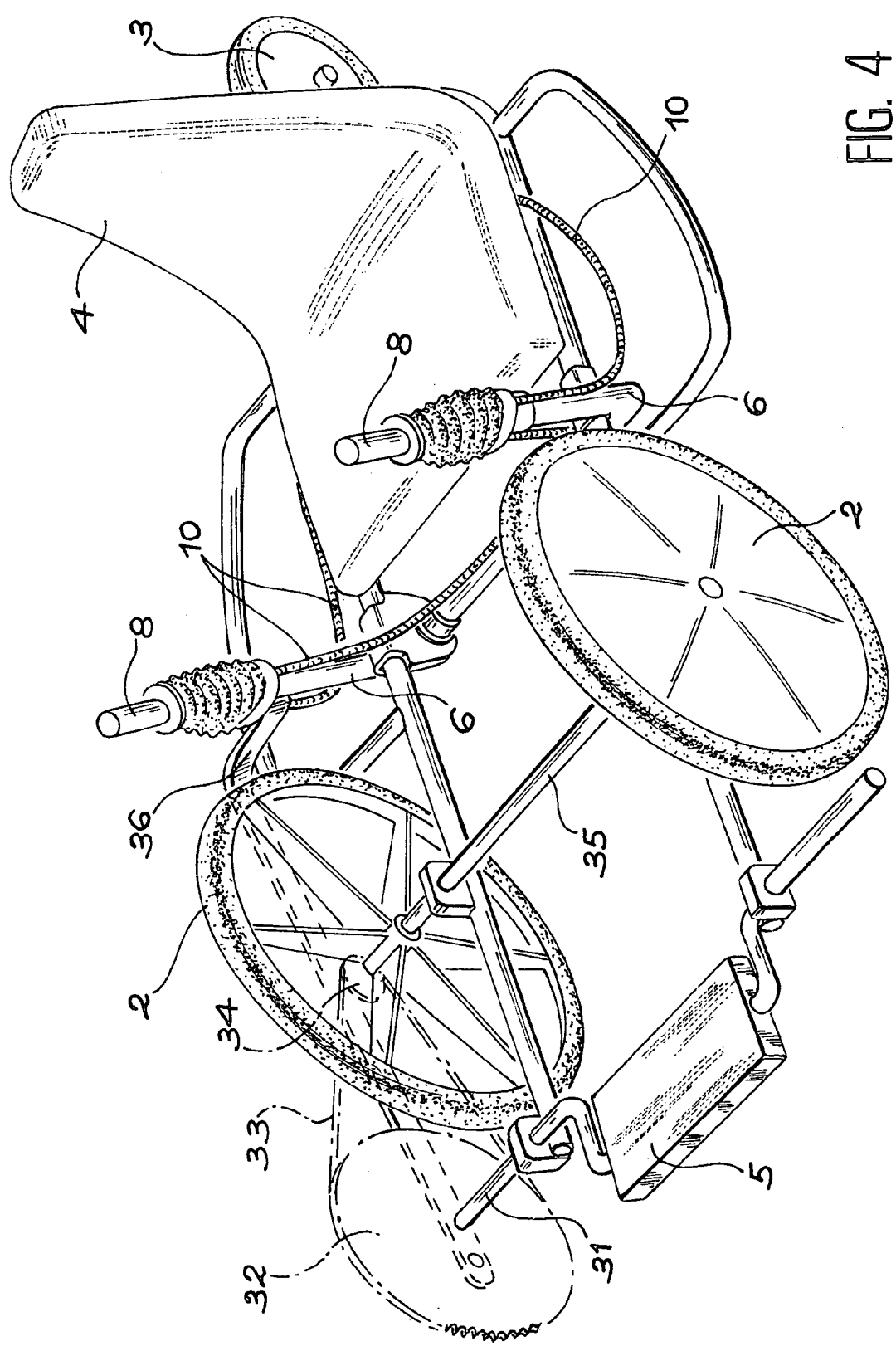

The invention and its various technical characteristics will be better understood after reading the following description accompanied by four figures showing respectively:

FIG. 1, the tricycle according to the invention;

FIG. 2, the principle diagram of the steering system according to the invention;

FIG. 3, a handle used in this steering system according to the invention;

FIG. 4, a variant embodiment of the tricycle according to the invention.

DESCRIPTION OF TWO EMBODIMENTS OF THE INVENTION

The control system according to the invention is described in its application to a tricycle.

FIG. 1 shows an asymmetric view of a tricycle according to the invention, in other words equipped with a steering system according to the invention.

It includes mainly a frame 1, a driving wheel 2 and a free wheel 2' that in this case are two front wheels, and one rear wheel 3 that is a steering wheel. It would be possible to use two driving wheels with a differential. A seat is mounted on frame 1, at the rear steering wheel 3.

The tricycle is propelled by the combined efforts made by a driver on the seat 4 pedalling on a single propulsion pedal 5 and actuating two side propulsion arms 6.

Since the propulsion pedal 5 is central and there is only one, the driver's feet and legs produce a combined movement. The same is true for the driver's arms, since the propulsion arms 6 of the tricycle are coupled in a synchronised manner and in phase. This type of propulsion is very much like a rowing cycle. The propulsion pedal 5 is installed on a drive shaft 7 in the form of a crankshaft, driving the driving wheel 2 directly. The two side propulsion arms 6 are installed free to pivot about a horizontal axis fixed on the frame 1 and are connected to the driving wheels 2 through a connecting rod 16.

The steering control of the tricycle according to the invention is done by two handles 8 each of which is installed free to pivot at the end of a side propulsion arm 6. Thus, when the side propulsion arms 6 are moved sufficiently, the driver can steer the tricycle on which he is seated, by taking action on the handles 8. These handles 8 may also be equipped with complementary controls such as brake controls, speed change, with or without indexing or a horn.

The various movements of the handles 8 controlling the steering of the tricycle are transmitted to the rear steering wheel 3 through two first cables symbolised by their respective sheaths 10 and each of which is fixed by a first end to one of the two handles 8 and the other end of which is fixed to a steering shaft 9 on which the rear steering wheel 3 is installed free to turn. This steering shaft 9 is installed approximately vertical on the frame so that it can turn and make the rear steering wheel 3 pivot.

It is noticed that the propulsion system with a single central pedal 5 releases space between the driver's legs. Furthermore, it enables the driver to wear any type of shoes. In the device described in patent FR-2 651 742, the closeness of the control handles to the pedals made it necessary to wear safety shoes. Moreover, the pedal 5 is significantly larger and specific systems can be fitted to it such as medical re-education products, particularly for fixing the user's feet, or even racing cycle type attachments.

Therefore, FIG. 2 shows the principle diagram of the steering system according to the invention. It shows two handles 8 placed at the ends of the two propulsion arms 6, both being side and fixed with respect to each other. Three cables are also shown in addition to this element, including two first cables 12D and 12G and a second cable 13. Furthermore, three pulleys 14D, 14G and 15 complete this system.

In fact, the two handles 8B, 8G are each fixed to one of the first two pulleys, 14D and 14G respectively. The first end of the first right cable 12D is fixed to the first right pulley 14D and its second end is fixed to the second pulley 15. Correspondingly, the first end of the first left cable 12G is fixed to the first left pulley 14G and its second end is fixed to the second pulley 15, in the opposite way and at the end of the first right cable 12D that is attached to it.

Note that the first two cables 12D and 12G are fixed to their corresponding pulleys 14D and 14G in an opposite way. Thus, if an operator actuates the two handles 8D and 8G simultaneously in the same way, one of the two pulleys 14D or 14G will pull the first cable 12D or 12G that is fixed to it and that will force the second pulley 15 to rotate in the direction of tension of this first cable thus actuated. The other first cable, that will not be pulled, will not exercise any action on the second pulley 15. Conversely, if the operator actuates the two handles 8D and 8G in the opposite direction simultaneously, the first cable 12D or 12G that would have applied a tension if one of the two handles 8D and 8G were moved in the opposite direction, will not be pulled nor tensioned. The other cable will be pulled, and will apply a tension on the second pulley 15, in the direction opposite to the direction in which the other first cable applies a tension if the handles 8D and 8G are moved in the opposite direction. It can easily be understood that the second pulley 15 can then be oriented in either direction simply by actuating the two handles 8D and 8G simultaneously. Note that this second pulley 15 is fixed to the steering shaft 9 in FIG. 1 and acts on the rear wheel 3 that is a steering wheel.

One very important characteristic of the invention consists of the presence of the second cable 13 that connects the two first pulleys 14D and 14G in the opposite way to the attachment point of the first two cables 12D and 12G on these first pulleys 14D and 14G. Thus, the two handles 8D and 8G are connected to each other directly. The effect of this is that the operator feels the tension applied on the second handle through a first of the two handles 8D and 8G, when the second handle is actuated so as to tension its first cable 12G and 12D. In other words, the user of this system can perfectly well use only one of these two grips 8D and 8G to rotate the second pulley 15, while keeping the two handles 8D and 8G parallel to each other. This arrangement has several advantages as follows.

Firstly, this characteristic facilitates coordination of the operator's movements, when the system is used to guide a tricycle or a light vehicle.

Secondly, in an extreme situation or an accident, it is possible for the steering system to respond to a reflex concept, thus providing absolute reliability in responding to the operator's actions. In this type of situation, the operator's reflexes control the steering of the vehicle, and these reflexes can be materialised by gestures of one of the two hands. In other words, in this type of accident situation in which reflexes only are involved, it is unthinkable that the operator should have to think clearly in order to control simultaneous coordination of the two handles 8D and 8G which would be independent, without the control system according to the invention.

Another advantage of the coordination of the movements of the two handles 8D and 8C is to prevent the occurrence of excessive tensions in the first two cables 12B and 12G when simultaneous movements of the two handles 8D and 8G are not identical. This avoids premature wear of the first two cables 12B and 12G.

Note that different diameters could be provided for the second pulley 15 with respect to the first two pulleys 14D and 14G, to create a steering ratio between the pivot amplitude of the two handles 8D and 8G and the pivot amplitude of the steering shaft to which the second pulley 15 is fixed. For example, if the first pulleys 14D and 14G have a diameter of 60 mm and the second pulley 15 has a diameter of 45 mm, there is a steering ratio of ¾. This means that the second pulley 15 can be rotated by 120° when the two handles 8D and 8G are rotated by only 90°. This enables good manoeuvrability for vehicles equipped with this steering system.

It would also be possible to make the three cables 12D and 12G and 13 in the form of a single cable fixed to the three pulleys 14B, 14G and 15.

The arrangement of the handles is described in detail with reference to FIG. 3.

The figure shows a single handle 8. It is shown free to pivot about a rotation axis 18 fixed with respect to the side propulsion arms 6. This is done using two side plates 17 rigidly fixed to the end of a side propulsion arm 6. This set up is done using the first corresponding pulley 14, to which the handle is rigidly fixed. It is even possible that these two elements could be made from a single part. One end 22 of one of the two first cables 12 is fixed to the pulley 14, and one end 23 of the second cable 13 opposite the first cable. Note that the first cable 12 and the second cable 13 may each be surrounded by a sheath 10, the end of which stops on a stop 19 of the sheath fixed on the two side plates 17 and the side propulsion arm 6. These cables 12 and 13 can be fixed on the pulley 14 by means of injected end pieces.

A rubber bellows not shown can advantageously protect the assembly, thus including a standard and safety aspect preventing the operator's fingers from getting trapped.

Note that in the application of this steering system to a tricycle, the handles 8 are equipped with complementary brake controls, a speed change with or without indexing, and possibly a horn.

With reference to FIG. 4, it would be possible to arrange the pedal 5 such that it has no direct connection with the driving wheel(s), and instead is engaged to a drive crank shaft 31 placed offset from the axis 35 of the driving wheel or the two driving wheels 2. This type of drive crank shaft would rotate a first toothed wheel 32 itself driving a transmission chain 33. This transmission chain is wound onto a second toothed wheel 34 fixed to the axis 35 of the driving wheel or the two driving wheels 2. The first toothed wheel 32 is a multifunction device since it can also hold the connecting rod 36 installed free to pivot on one of the propulsion arms 6, in this case the drive crank shaft 31 and the first toothed wheel 32 being located beyond the driving wheels 2 on the other side of the driver's seat. This eliminates the risk of the driver getting his hand trapped in the transmission and movement coordination system, particularly at the connecting rod 36. The transmission chain 33 can be replaced by a belt or any means of transmission, the two toothed wheels 32 and 34 could then be replaced by belt wheels.

Note that the driving wheels 2 have been shown in lenticular form. This prevents a hand or fingers from getting trapped between the driving wheels 2 and the propulsion connecting rod 16 or 36, since due to the lenticular form, these fingers or this hand will only slide on the plate of this lenticular shaped wheel.

Note that an offset has to be provided between the orientation angles of the crankshaft on which the pedal 5 is mounted and the angle formed by the articulation point of the transmission connecting rods 36 and 16.

A judicious phase difference of the neutral points of each movement (propulsion arm 6 and the drive crank shaft 7 or 31) can then optimise the overall efficiency of the device.

Obviously, the number of connecting rods 16 or 36 could be doubled up so that there is one on each side of the tricycle, to balance the weight and forces on the transmission system.

The steering wheel of the tricycle according to the invention can be either at the front or at the back. Similarly, it is also possible to envisage a single driving wheel and two steering wheels. Note that this type of propulsion can also be adapted on other vehicles, not only quadricycles and bicycles, but also on vehicles that have to move on water, snow or ice. The control system can also be fitted on other fixed devices such as physical exercise equipment installed in gymnasiums for indoor sports. It would also be possible to adapt the control system according to the invention on behavioural control and medical re-education apparatuses. Finally, static game facilities can also benefit from such a control system, particularly in installations for leisure parks for children. In these cases, the system according to the invention is generalised in the form of a control system for a mobile part of an arbitrary device in the installation.

The invention claimed is:

1. A tricycle with a cable steering system comprising:
   at least one steering wheel mounted on a tricycle installed free to rotate about an axis perpendicular to a steering shaft;
   a first pivoting side handle fixed to a first end of a first cable;
   a second pivoting side handle fixed to a first end of a second cable, wherein a second end of the first cable is fixed to a first side of said steering shaft and a second end of the second cable is fixed to a second side of said steering shaft to control the orientation of the steering wheel by pivoting one of the first and second side handles in order to create tension in one of the first and second cables and to cause rotation of the steering shaft;

a third cable, a first end of which is fixed to the first side handle opposite the first end of the first cable and a second end of which is fixed to the second side handle opposite the first end of the second cable; and the tricycle further including two propulsion arms, each mounted free to pivot about an approximately horizontal axis, to oscillate each on one side of the tricycle, wherein the first and second side handles are each mounted free to pivot about an approximately horizontal axis, each at the upper end of one of the two propulsion arms, wherein the propulsion arms are coupled together so that they are actuated at the same time and in the same direction, to contribute to propulsion of the tricycle, by acting on a connecting rod/crank system linked to two driving wheels, wherein the tricycle has a single traction pedal located on the center line of the tricycle, in front of a driver's seat, on a cranked drive shaft, to drive the two driving wheels of the tricycle.

2. Tricycle with a cable steering system according to claim 1, wherein the cranked drive shaft is the axle of the two driving wheels.

3. Tricycle with a cable steering system according to claim 1, wherein the cranked drive shaft drives a first toothed wheel, the first toothed wheel driving a second toothed wheel fixed to a spindle of the driving wheels through a drive chain.

* * * * *